(12) United States Patent
Du et al.

(10) Patent No.: US 9,280,014 B2
(45) Date of Patent: Mar. 8, 2016

(54) LIQUID CRYSTAL DISPLAY DEVICE WITH TOUCH FUNCTION

(71) Applicants: Shanghai Tianma Micro-Electronics Co., Ltd., Shanghai (CN); Tianma Micro-Electronics Co., Ltd., Shenzhen (CN)

(72) Inventors: Lingxiao Du, Shanghai (CN); Qijun Yao, Shanghai (CN); Tianyi Wu, Shanghai (CN); Sitao Huo, Shanghai (CN); Jun Ma, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/555,006

(22) Filed: Nov. 26, 2014

(65) Prior Publication Data

US 2015/0370114 A1    Dec. 24, 2015

(30) Foreign Application Priority Data

Jun. 23, 2014    (CN) .......................... 2014 1 0284408

(51) Int. Cl.
*G02F 1/1335*    (2006.01)
*G02F 1/1333*    (2006.01)
*G02F 1/1343*    (2006.01)

(52) U.S. Cl.
CPC ........ *G02F 1/13338* (2013.01); *G02F 1/13439* (2013.01); *G02F 1/133512* (2013.01); *G02F 1/134363* (2013.01)

(58) Field of Classification Search
CPC .......... G02F 1/13338; G02F 1/133512; G02F 1/134363; G02F 1/13439; G02F 1/13458; G02F 1/136227; G02F 2001/134372; G02F 1/136236; G06F 3/0412; G06F 3/044; G06F 1/1643; G06F 1/1652; G06F 2203/04102; G06F 2203/04103; G06F 3/0488; G06F 3/04883; G06F 3/04886; G06F 3/04897; H01L 27/1259
USPC ............................................ 349/12; 345/173
See application file for complete search history.

(56) References Cited

U.S. PATENT DOCUMENTS 8,228,309 B2 *   7/2012   Tamaki ................. G06F 3/0412
                                                        345/173
9,046,955 B1 *   6/2015   Lee ........................ G06F 3/0412
(Continued)

*Primary Examiner* — Anne Hines
*Assistant Examiner* — Jose M Diaz
(74) *Attorney, Agent, or Firm* — Anova Law Group, PLLC

(57) ABSTRACT

A liquid crystal display device includes multiple data lines and multiple scan lines insulatedly intersecting each other. Each of the pixel units includes a common electrode and a pixel electrode insulated from each other by an insulating layer, an in-plane electric field is formed by the common electrode and the pixel electrode The common electrodes are connected together to form a common electrode layer, which comprises multiple touch electrodes and touch signal wires. Each of the touch signal wires is electrically connected with a corresponding touch electrode, first slits are arranged in parallel to the data lines, each of the first slits is disposed between two adjacent touch electrodes or between a touch electrode and an adjacent touch signal wire, except at a junction between the touch signal wire and the touch electrode. A first slit overlaps with a pixel electrode within a pixel unit.

13 Claims, 10 Drawing Sheets

(56) References Cited

U.S. PATENT DOCUMENTS

| | | | |
|---|---|---|---|
| 2012/0038585 A1* | 2/2012 | Kim | G06F 3/0412 345/174 |
| 2015/0035791 A1* | 2/2015 | Mo | G09G 3/3648 345/174 |
| 2015/0192814 A1* | 7/2015 | Kosugi | G06F 3/0412 349/12 |
| 2015/0212548 A1* | 7/2015 | Namkung | G06F 1/1652 345/174 |
| 2015/0309634 A1* | 10/2015 | Lee | G06F 3/0412 345/173 |

* cited by examiner

LIQUID CRYSTAL DISPLAY DEVICE WITH TOUCH FUNCTION

CROSS-REFERENCES TO RELATED APPLICATIONS

This application claims the benefit of priority to Chinese patent application No. 201410284408.6, filed on Jun. 23, 2014 and entitled "LIQUID CRYSTAL DISPLAY DEVICE WITH TOUCH FUNCTION", the content of which is incorporated herein by reference in its entirety.

FIELD OF THE INVENTION

The present disclosure relates to a liquid crystal display device, and in particular, to a liquid crystal display device with a touch function.

BACKGROUND OF THE INVENTION

When used as a flat panel display device, a liquid crystal display (LCD) device, a plasma display panel (PDP) device, a field emission display (FED) device, and an electroluminescent display (ELD) device each include a flat display panel for displaying images. The flat display panel includes a pair of combined opposite transparent insulated substrates, and a special luminescent or polarized material layer is placed between the pair of substrates. Among these flat panel display devices, the LCD device controls transmittance of liquid crystals via an electric field to display images. In this end, the LCD device includes a display panel having liquid crystal units, a backlight unit for guiding lights to the display panel, and a drive circuit for driving the liquid crystal units. Recently, there are increasing needs for incorporating a touch panel into the LCD device, to sense an area of the touch panel that is touched by a finger or other means and send information related to the touch event. Moreover, for the miniaturization of the device, some components may be shared by the LCD device and the touch panel, however, sharing components between the LCD device and the touch panel may cause adverse interactions therebetween.

BRIEF SUMMARY OF THE INVENTION

The present application discloses a liquid crystal display device, which includes a plurality of data lines and a plurality of scan lines intersecting each other and electrically insulated from each other; a plurality of pixel units defined by the data lines and the scan lines, each of the pixel units comprising a common electrode and a pixel electrode electrically insulated from each other by an insulating layer, the common electrode and the pixel electrode of a pixel unit forming an in-plane electric field when a voltage is applied thereto; a common electrode layer comprising a plurality of the common electrodes connected together, a plurality of touch electrodes, and a plurality of touch signal wires, wherein each of the touch signal wires is electrically connected with a corresponding touch electrode; and a plurality of first slits disposed in parallel to the data lines, each of the first slits being disposed between two adjacent touch electrodes or between a touch electrode and an adjacent touch signal wire, but not at a junction between the touch electrode and the adjacent touch signal wire, wherein a first slit overlaps with a pixel electrode within a pixel unit.

DETAILED DESCRIPTION OF THE INVENTION

Figure 1:
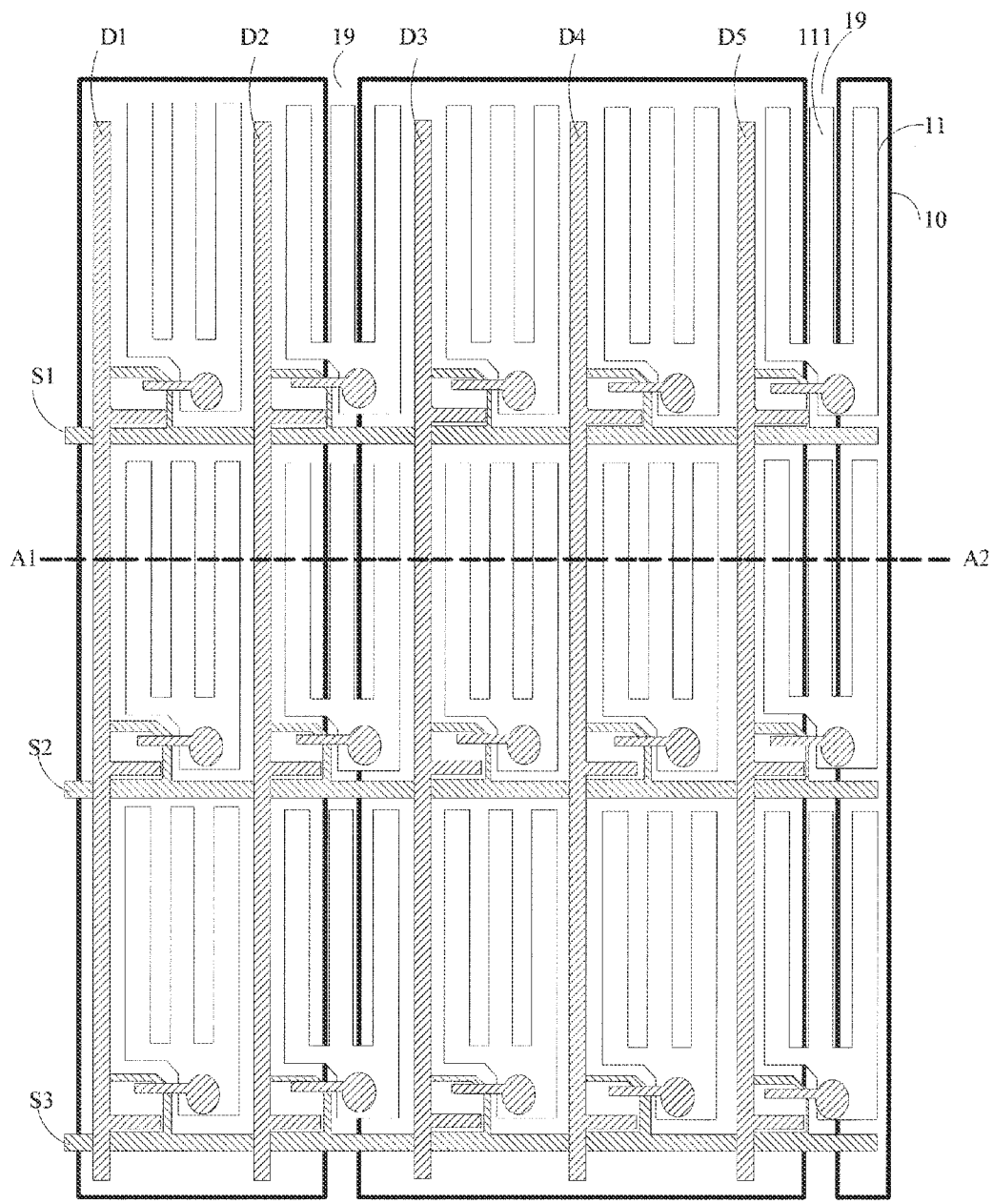
FIG. 1 is a schematic diagram of an array substrate of a liquid crystal display device according to a first embodiment of the disclosure.
Figure 2:
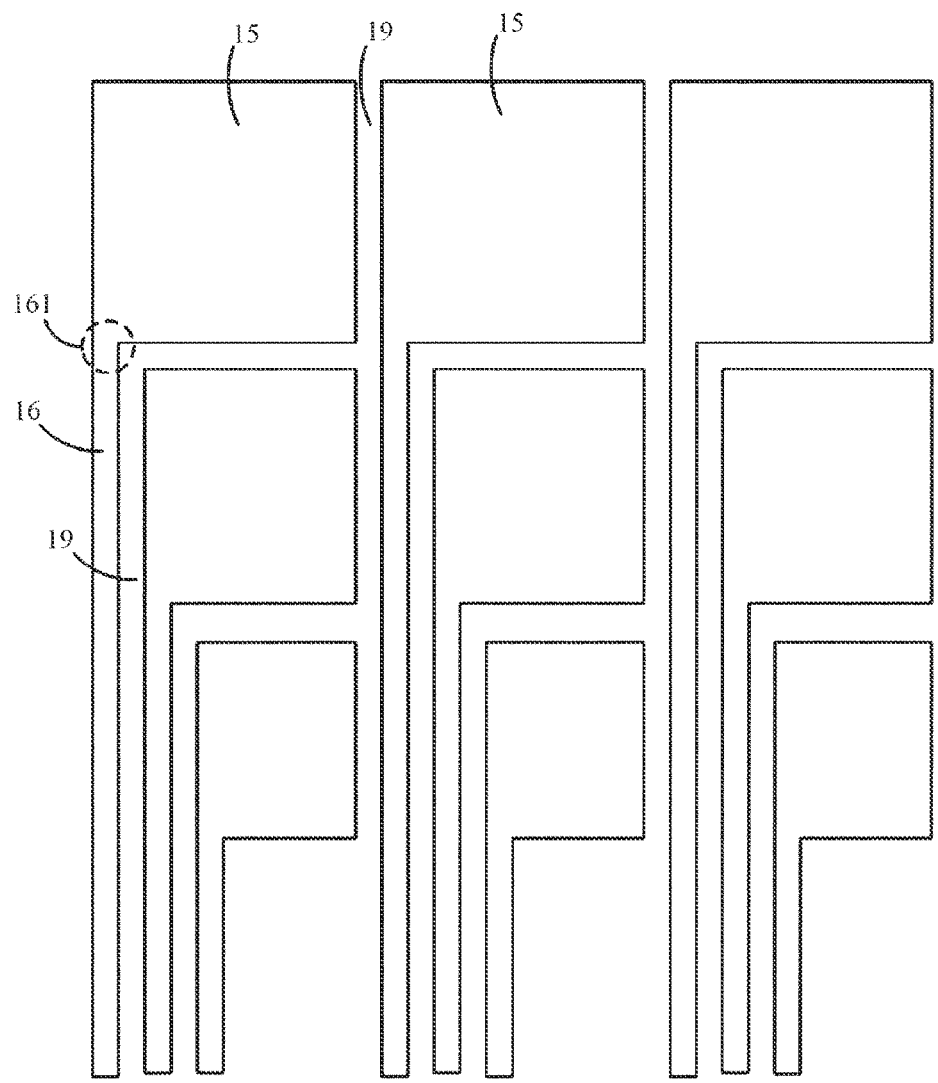
FIG. 2 is a schematic diagram of a common electrode layer of the liquid crystal display device according to the first embodiment of the disclosure.
Figure 3:
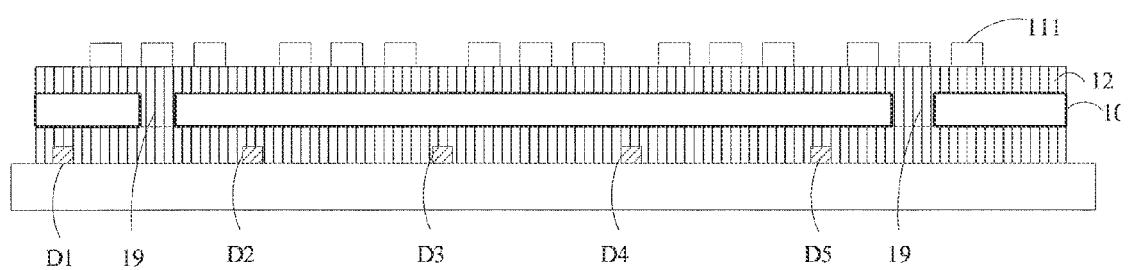
FIG. 3 is a sectional view taken along the line A1-A2 in FIG. 1.

A first embodiment of the present disclosure provides an LCD device. Referring to FIG. 1 to FIG. 3, FIG. 1 is a schematic diagram of an array substrate of the LCD device according to the first embodiment of the present disclosure, FIG. 2 is a schematic diagram of a common electrode layer of the liquid crystal display device according to the first embodiment of the present disclosure, and FIG. 3 is a sectional view taken along a line A1-A2 in FIG. 1. The LCD device includes a plurality of data lines for instance D1, D2, D3, D4, and D5 and a plurality of scan lines for instance S1, S2 and S3. The plurality of data lines insulated (i.e., electrically insulated from the scan lines) intersect the plurality of scan lines, and the plurality of data lines and the plurality of scan lines define a plurality of pixel units to form a pixel unit array. FIG. 1 only illustrates pixel units in 3 rows and 5 columns for example.

Each pixel unit includes a common electrode 10 and a pixel electrode 11. An insulating layer 12 is located between the common electrode 10 and the pixel electrode 11, and an in-plane electric field may be formed by the common electrode 10 and the pixel electrode 11 when a voltage is applied thereto. Specifically, in the first embodiment, the common electrode 10 is located under (below) the pixel electrode 11, and the common electrode 10 is a planar electrode. The pixel electrode 11 includes a plurality of strip electrodes 111. The in-plane electric field formed between the planar common electrode 10 and the plurality of strip electrodes 111 of the pixel electrode 11 is for driving liquid crystal molecules to rotate. Specifically, the in-plane electric field refers to an electric field formed between the pixel electrode 11 and the common electrode 10 and has a direction parallel to the array substrate. For example, in the Fringe Field Switching (FFS)-type or In-Plane Switching (IPS)-type display mode, the liquid crystal molecules are driven by an in-plane field for displaying images. The liquid crystal display device according to the disclosure may be an FFS-type liquid crystal display device or an IPS-type liquid crystal display device.

Referring to FIG. 2, a common electrode layer forming a plurality of the common electrodes 10 is further adapted to form touch electrodes 15 and touch signal wires 16 of a touch structure. Each touch signal wire 16 is electrically connected with a corresponding touch electrode 15. First slits 19 are arranged in parallel to the data lines, each of the first slits 19 is disposed between two adjacent touch electrodes 15 or between a touch electrode 15 and an adjacent touch signal wire 16, except at a junction 16 between the touch signal wire 16 and the touch electrode 15. A first slits 19 overlaps with a pixel electrode 11.

Specifically, in the prior art, the common electrode layer is a complete plane relative to the pixel unit array, and the part of the common electrode layer that corresponds to each pixel unit forms one common electrode, and a plurality of the common electrodes are connected together. In the first embodiment of the disclosure, the touch electrodes 15 and the touch signal wires 16 are formed by etching the common electrode layer. Generally, the size of the touch electrode 15 is much larger than one pixel unit, and may be as large as 60×60 pixel units. However, slits respectively exist between adjacent touch electrodes 15 and between the adjacent touch electrode 15 and the touch signal wire 16 to separate and insulate the adjacent touch electrodes 15 from each other and separate and insulate the adjacent touch electrode 15 and the touch signal wire 16 from each other. The slits include first slits 19 parallel to the data lines, and the first slits 19 overlap with the strip electrodes 111 of the pixel electrode 11.

In the first embodiment, the touch structure is a single-layer self-capacitance structure. In other embodiments, the common electrode layer may also be used for forming other structures or other types of touch structures.

Figure 4A:
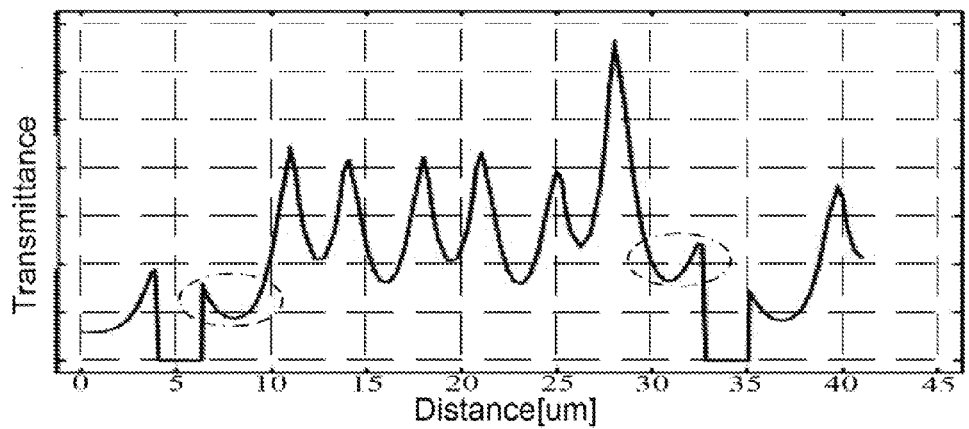
FIG. 4A is a graph showing transmittance of a pixel unit where slits in the common electrode layer are arranged above data lines.
Figure 4B:
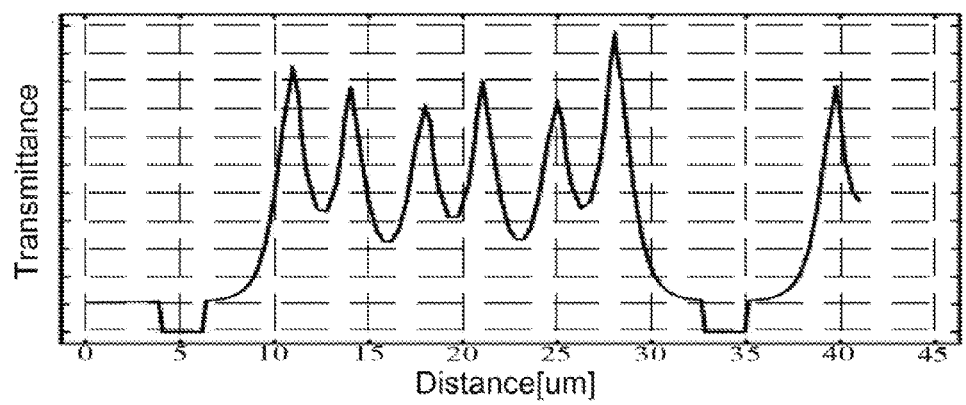
FIG. 4B is a graph showing the transmittance of a pixel unit where there is no slit in the common electrode layer above a data line.

In a known liquid crystal display with a touch function, the slits in the common electrode layer typically superpose the data lines. Because a black matrix is provided on a color filter substrate above the data lines and hence covers the slits, the slits are invisible. However, the slits superposing the data lines will influence the image display effect. Especially in displaying a low gray-scale image, the slits in the common electrode layer above the data lines may be seen by human eyes, thus resulting in a poor display effect. Referring to FIG. 4A and FIG. 4B, FIG. 4A is a graph showing the transmittance of a pixel unit where the slits in the common electrode layer are arranged above the data lines, and FIG. 4B is a graph showing the transmittance of a pixel unit where there is no slit in the common electrode layer above a data line. As seen from FIG. 4A, data lines are disposed at positions 5 μm and 35 μm along a Distance axis, thus the transmittance in the positions 5 μm and 35 μm is basically zero. In FIG. 4A, two positions circled by broken lines are those where the pixel electrodes are proximate to the data lines, and the transmittance at the two positions are also much lower than that at a region close to the interior of the pixel unit. Then referring to FIG. 4B, the transmittance is uniform and is not influenced by the data lines in the pixel unit along the Distance axis. This is mainly because the common electrode layer above the data lines shields the electric field of the data lines. When slits exist above the data lines, the electric field of the data lines will negatively influence the display of the pixel units, reducing the transmittance.

In order to shield the data lines by the common electrode layer in the first embodiment of the disclosure, the first slits 19 are arranged to overlap with the pixel electrodes 11. Specifically, the first slits 19 are arranged to at least partially overlap with the plurality of strip electrodes 111 of the pixel electrodes 11. The portion of the first slit 19 shielded by the strip electrode 111 will not negatively influence the display effect of the pixel units.

Preferably, the first slits 19 completely overlap with the strip electrodes 111 in the pixel electrode 11, and hence are completely shielded by the strip electrodes 111, thus the first slits 19 will not negatively influence the display effect of the pixel units.

In consideration of available techniques and an actual design, it is allowed that a distance between an edge of the first slit 19 and an edge of the strip electrode 111 overlapping this first slit 19 is below 1 μm, and such distance will not cause significant influence to the display effect of the pixel units. Optionally, in a light transmission direction, a projection of each of the first slits 19 falls within a projection of the corresponding strip electrode 111 of the pixel electrode 11, namely, each of the first slits 19 completely overlaps with the corresponding strip electrode 111, and the width of the first slit 19 is less than the width of the corresponding strip electrode 111; or in the light transmission direction, the projection of the corresponding strip electrode 111 of the pixel electrode 11 falls within the projection of the first slit 19, namely, each of the first slits 19 completely overlaps with the corresponding strip electrode 111, and the width of the corresponding strip electrode 111 is less than the width of the first slit 19, so long as the distance between the adjacent edges of the first slit and the strip electrode 111 does not exceed 1 μm.

Figure 5:
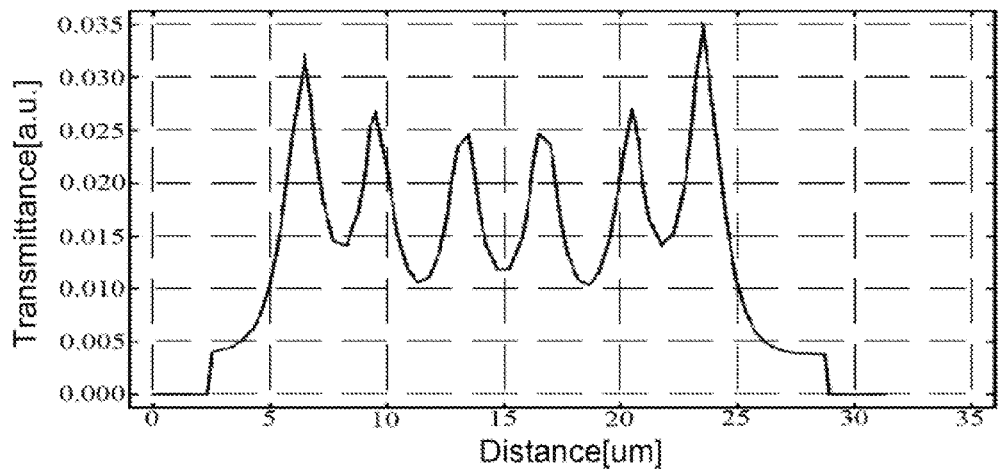
FIG. 5 is a schematic simulated diagram of the transmittance of one of the pixel units of the liquid crystal display device according to the first embodiment of the disclosure.

FIG. 5 shows a schematic simulated diagram of the transmittance of one pixel unit of the liquid crystal display device according to the first embodiment of the disclosure. The pixel electrode 11 includes three strip electrodes 111. The first slit 19 overlaps with the middle one of the three strip electrodes 111, the edge of the first slit 19 is disposed at a distance of 1um away from the edge of the middle one of the three strip electrodes 111 and the pixel unit operates in a low gray scale mode. As seen from FIG. 5, the transmittance is uniform and the display effect is good across the entire width of one pixel unit.

In the first embodiment of the disclosure, the first slit 19 overlaps with the middle one of the three strip electrodes 111. In other embodiments, the first slit 19 may overlap with any one of the three strip electrodes 111 of the pixel electrode 11, meanwhile achieving the same effect as the first embodiment.

Preferably, all the first slits 19 are located inside the pixel units of the same color. As shown above, the edge of each of the first slits 19 may be disposed at a certain distance away from the edge of the strip electrode 111 that overlaps with the first slit 19, which will somewhat influences the display effect, namely, the transmittance of a pixel unit with the first slit 19 is slightly different from that of a pixel unit without the first slit 19. If all the first slits 19 are arranged inside the pixel units of the same color, the influence caused by the transmittance difference will be reduced visually. Preferably, all the first slits 19 are arranged inside the blue pixel units, because the human eyes are insensitive mostly to blue among colors including red, green, and blue, thus the influence caused by the transmittance difference may be further reduced.

Figure 6:
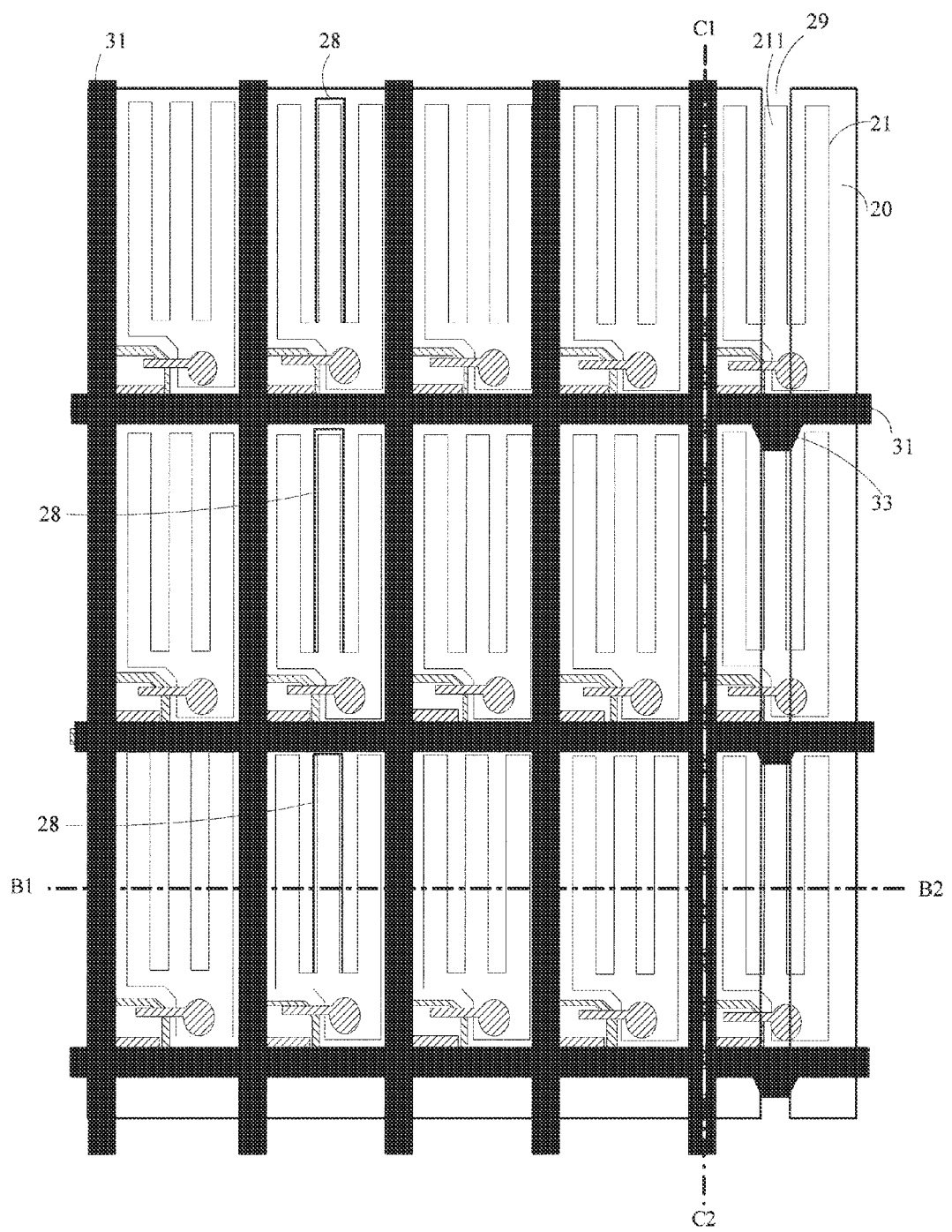
FIG. 6 is a schematic diagram of a liquid crystal display device according to a second embodiment of the disclosure.
Figure 7:
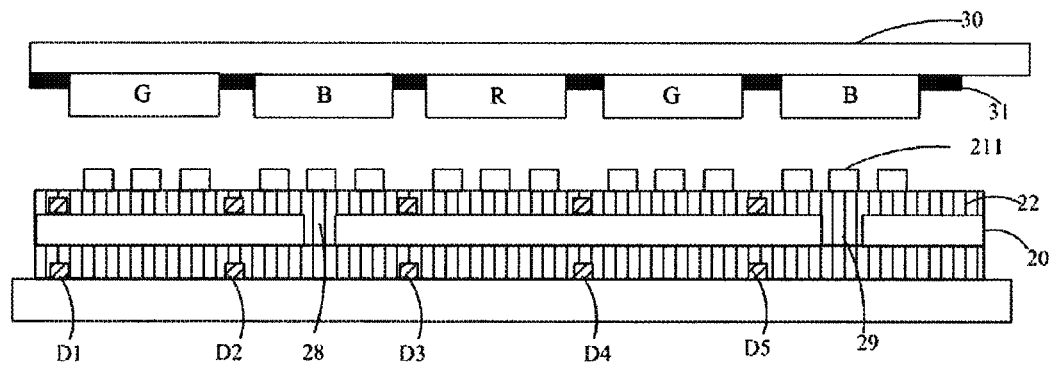
FIG. 7 is a sectional view taken along the line B1-B2 in FIG. 6.
Figure 8:
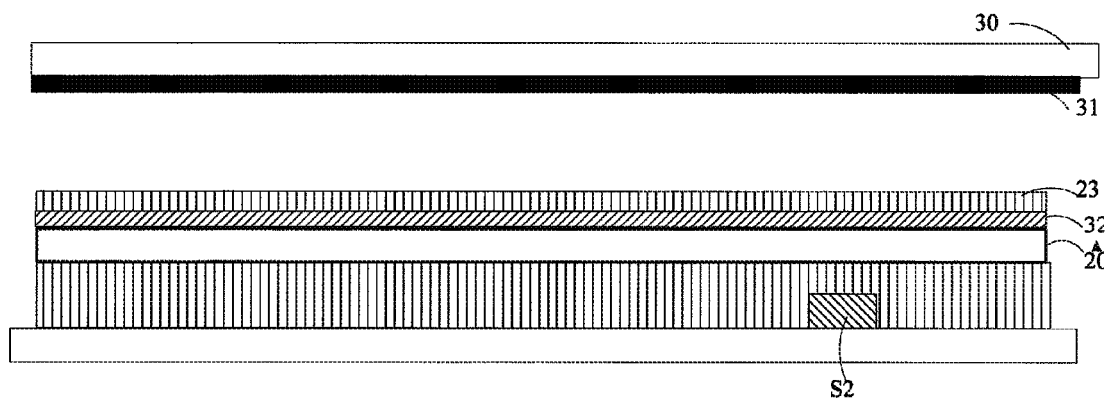
FIG. 8 is a sectional view taken along the line C1-C2 in FIG. 6.

A second embodiment of the disclosure provides a liquid crystal display device. Referring to FIG. 6 to FIG. 8, FIG. 6 is a schematic diagram of the liquid crystal display device according to the second embodiment of the disclosure, FIG. 7 is a sectional view taken along a line B1-B2 in FIG. 6, and FIG. 8 is a sectional view taken along a line C1-C2 in FIG. 6. Like the liquid crystal display in the first embodiment, the liquid crystal display device in the second embodiment includes a plurality of data lines D1, D2, D3, D4 and D5 and a plurality of scan lines S1, S2 and S3 (only a data line S2 is shown in FIG. 8). The plurality of data lines intersect the plurality of scan lines and are electrically insulated from the scan lines. The plurality of data lines and the plurality of scan lines define a plurality of pixel units, each of which includes a common electrode 20 and a pixel electrode 21. An insulating layer 22 is located between the common electrode 20 and the pixel electrode 21, and an in-plane electric field may be formed by the common electrode 20 and the pixel electrode 21. Specifically, in the second embodiment, the common electrode 20, which is a planar electrode, is disposed under (below) the pixel electrode 21, and the pixel electrode 21 includes a plurality of strip electrodes 211. The in-plane electric field formed between the common electrode 20 and the plurality of strip electrodes 211 of the pixel electrode 21 and is used for driving liquid crystal molecules to rotate. A common electrode layer forming a plurality of the common electrodes 20 is further adapted to form touch electrodes and touch signal wires of a touch structure. Each touch signal wire is electrically connected with the corresponding touch electrode, and first slits 29 are arranged in parallel to the data line, each of the first slits is disposed between two adjacent touch electrodes or between a touch electrode and an adjacent touch signal wire, except at a junction between the touch signal wire and the touch electrode. In other words, a first slit is disposed between two adjacent touch electrodes or between a touch electrode and a touch signal wire of an adjacent touch electrode, but the first slit is not disposed at the location where the touch signal wire interfaces the adjacent touch electrode. The term "a junction between the touch signal wire and the touch electrode" refers to the interface location or the interface node between the touch signal wire and the associated touch electrode. The term "except at a junction" refers to as "and not at a junction" or "not at a junction" hereinafter. Each of the first slits 29 overlaps with one pixel electrode 21.

The liquid crystal display device further includes a color filter substrate 30, and a black matrix 31 is arranged on one side of the color filter substrate 30 that faces the array substrate. The black matrix 31 corresponds to the plurality of data lines and the plurality of scan lines and shields the plurality of data lines and the plurality of scan lines. Color filters are further arranged in the slits of the black matrixes 31. Here, the color filters include blue color filters B, green color filters G and red color filters R. Preferably, the first slits 29 are respectively arranged inside the pixel units corresponding to the blue color filters B.

The common electrode further includes a second slit 28. Specifically, the second slit 28 is arranged inside a pixel unit corresponding to the blue color filter B, and no first slit 29 is arranged inside the pixel unit where the second slit 28 is arranged. The width of the second slit 28 is the same as the width of the first slit 29. Similar to the first slit 29, the second slit 28 also overlaps with the one of the plurality of strip electrodes 211 of the pixel electrode 21.

The first slits 29 are respectively arranged inside the pixel units corresponding to the blue color filters B because human eyes are most insensitive to the blue color, and thus the influence caused by the transmittance difference may be reduced.

Moreover, in order to make the transmittance of the pixel units corresponding to the blue color filters B uniform, the second slit 28 is arranged in the common electrode of the blue pixel unit without the first slit 29. The width of the second slit 28 is the same as that of the first slit 29, and the second slit 28 also overlaps with one of the plurality of strip electrodes 211 of the pixel electrode 21, thus, the pixel units corresponding to all the blue color filters B are provided with slits having the same width on the common electrode layer, leading to an effect of more uniform display.

Preferably, a metal conductive layer 32 is further arranged at positions on the common electrode layer that correspond to the data lines or the scan lines. The metal conductive layer 32 is electrically connected with the common electrode layer. The metal conductive layer 32 completely overlaps with the data lines or the scan lines in the light transmission direction, and is also shielded by the black matrix 31. Because the common electrode layer is typically made of indium tin oxide having a high resistance value, the resistance value may be reduced by adding the metal conductive layer 32, so that the energy consumption in transmitting the touch signal may be reduced. Moreover, because the metal conductive layer 32 is shielded by the black matrix 31, the display effect will not be influenced. In other implementations, the metal conductive layer may alternatively be located under the common electrode layer and electrically connected with the common electrode layer.

The first slit 29 overlaps with the scan line. Preferably, the black matrix 31 extends towards the inside of the pixel unit to form a first extension part 33 at an overlapping area where the first slit 29 and the scan line overlap. The first extension part 33 partially shields the first slit 29. Specifically, the first slit 29 typically penetrates through several columns of pixel units, thus the first slit 29 overlaps with the scan line(s), that is, the common electrode layer cannot shield the scan line in the overlapping area, and the electric field of the scan lines will influences the display effect. Therefore, in this embodiment, the first extension part 33 of the black matrix 31 is configured to partially shield the first slit 29 so as to eliminate the influence. Preferably, when the length of the first extension part 33 is within a range of 1 μm to 3 μm, abnormal display will be partially shielded without decreasing excessively the aperture ratio. Preferably, the first extension part 33 may be rectangle or trapezium shaped.

Preferably, at the second slit 28, the black matrix 31 extends toward inside of the pixel unit to form a second extension part, the shape of which is the same as the shape of the first extension part 33. The first extension portion 33 arranged at the pixel unit corresponding to the first slit 29 is mainly to shield the abnormal display caused by the electric field of the scan lines. The second slits 28 do not necessarily overlap with the scan lines to expose the scan lines out of the common electrode layer, but because the first extension portion 33 decreases partially the aperture ratio, the second extension part corresponding to the second slit 28 is also arranged and the shape of the second extension portion is the same as the shape of the first extension part 33 to decrease the aperture ratio to the same degree, in order to guarantee a uniform visual effect, thereby ensuing uniformity of the display.

Figure 9:
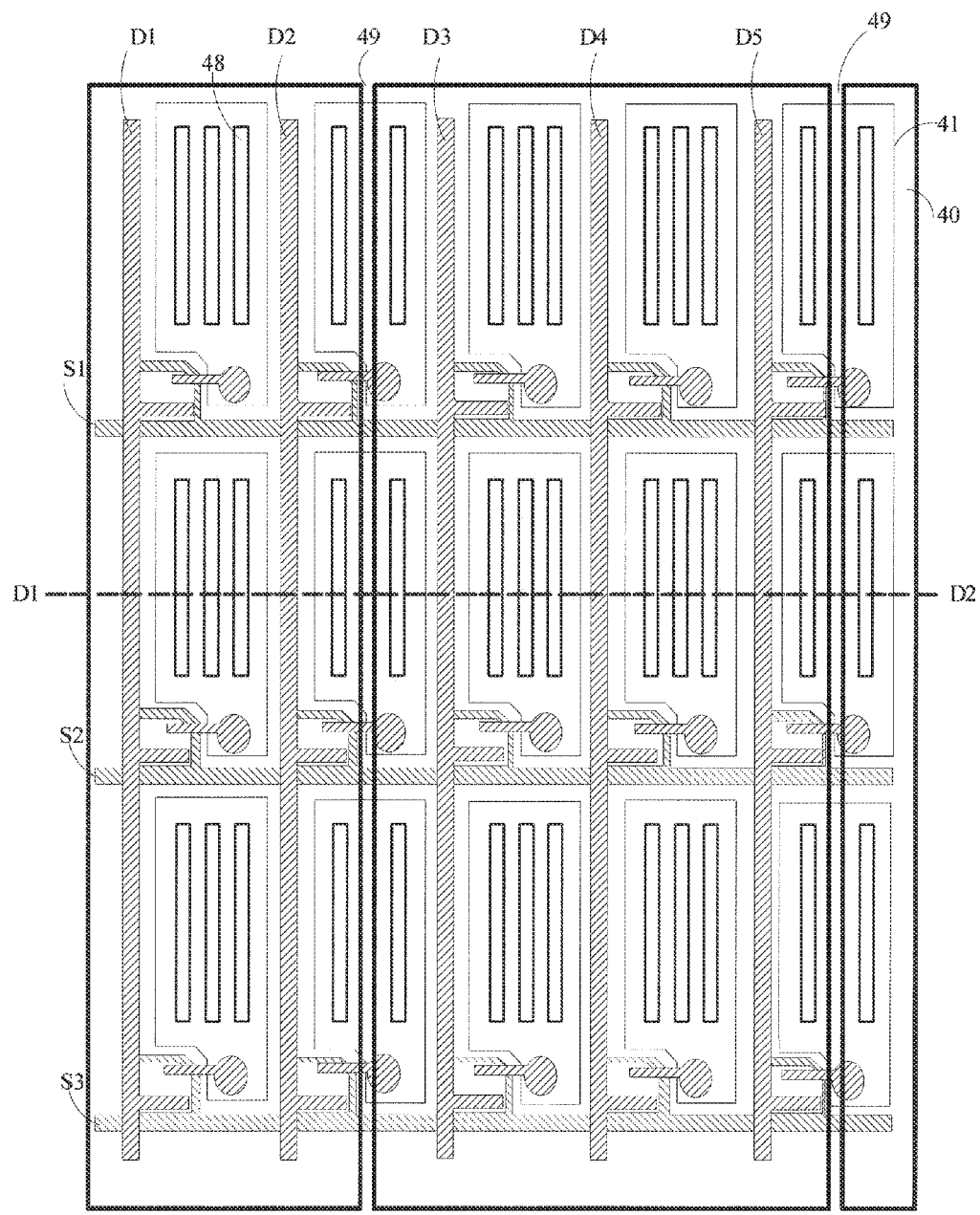
FIG. 9 is a schematic diagram of an array substrate of a liquid crystal display device according to a third embodiment of the disclosure.
Figure 10:
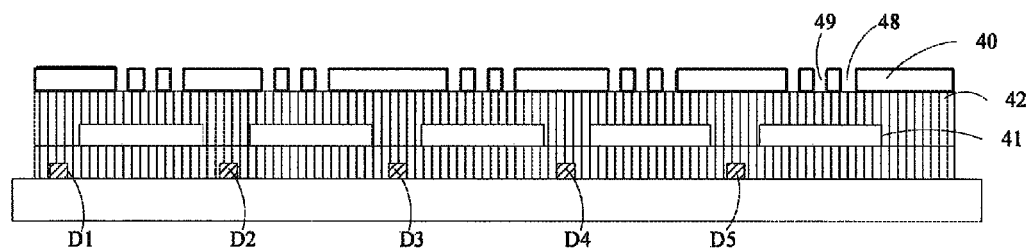
FIG. 10 is a sectional view taken along the line D1-D2 in FIG. 9.
Figure 11:
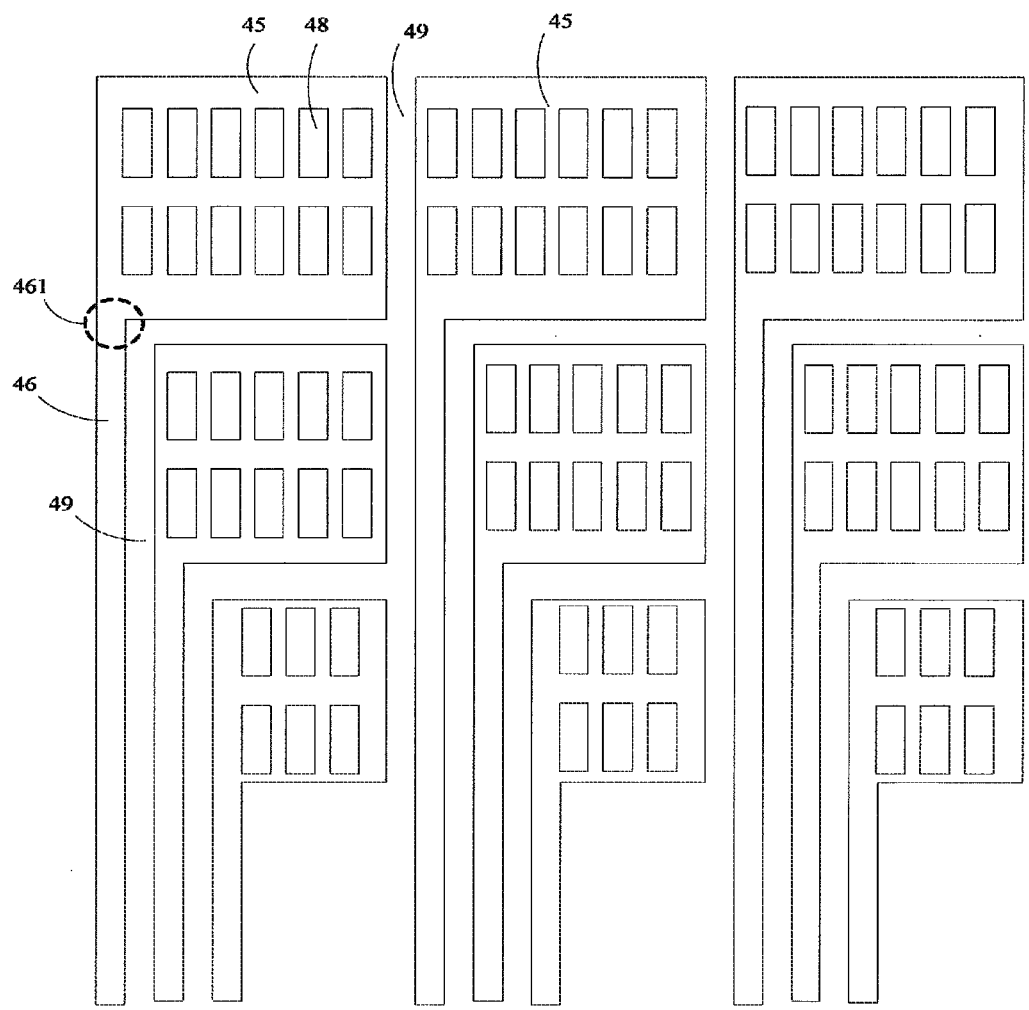
FIG. 11 is a schematic diagram of a common electrode layer of the liquid crystal display device according to the third embodiment of the disclosure.

The third embodiment of the disclosure provides a liquid crystal display device. Referring to FIG. 9 to FIG. 11, FIG. 9 is a schematic diagram of an array substrate of the liquid crystal display device according to the third embodiment of the disclosure, FIG. 10 is a sectional view taken along a line D1-D2 in FIG. 9, and FIG. 11 is a schematic diagram of a common electrode layer of the liquid crystal display device according to the third embodiment of the disclosure.

As shown in the figures, the liquid crystal display device includes a plurality of data lines for instance D1, D2, D3, D4 and D5 and a plurality of scan lines for instance S1, S2 and S3. The plurality of data lines insulated intersect the plurality of scan lines, and the plurality of data lines and the plurality of scan lines define a plurality of pixel units. FIG. 9 only shows pixel units in 3 rows and 5 columns.

Each pixel unit includes a common electrode 40 and a pixel electrode 41, an insulating layer 42 is located between the common electrode 40 and the pixel electrode 41, and an in-plane field may be formed by the common electrode 40 and the pixel electrode 41. Specifically, in the third embodiment, the common electrode 40 is located above the pixel electrode 41 which is a planar electrode, and the common electrode 40 has a third slit 48 for forming the in-plane field with the pixel electrode 41.

Referring to FIG. 11, a common electrode layer forming a plurality of the common electrodes 40 is further adapted to form touch electrodes 45 and touch signal wires 46 of a touch structure. Each touch signal wire 46 is electrically connected with a corresponding touch electrode 45, and first slits 49 parallel to the data lines each exist between adjacent touch electrodes 45 or between the touch electrode 45 and the touch signal wire 46 adjacent to each other, except at a junction 461 between the touch signal wire 46 and the touch electrode 45. The first slit 49 at least partially overlaps with the third slit 48.

The pixel electrode is shaped as a planar electrode and the common electrode is formed with slits, resulting in a structure for forming an in-plane field. The first slits 49 between adjacent touch electrodes 45 and between the touch electrode 45 and the adjacent touch signal wire 46 at least partially overlap with the third slits 48, respectively, thereby alleviating the decrease of the aperture ratio caused by the first slit 49 and improving the display effect of the liquid crystal display device. Optionally, the width of the first slit 49 may be larger than that of the third slit 48 by a difference value of about 1 μm.

Preferably, the first slits 49 are all located inside the pixel units of the same color. The influence caused by the transmittance difference will be reduced visually by arranging all the first slits 49 inside the pixel units of the same color. Preferably, all the first slits 49 are arranged inside the pixel units corresponding blue color filters, because among red, green and blue, the human eyes are the most insensitive to blue, thus the influence caused by the transmittance difference may be further reduced.

Preferably, a metal conductive layer is further arranged at a position on the common electrode layer that corresponds to the data line or the scan line. The metal conductive layer is electrically connected with the common electrode layer. The metal conductive layer completely overlaps with the data line or the scan line in the light transmission direction and is also shielded by the black matrix. Because the common electrode layer is typically made of indium tin oxide having large resistance, the resistance may be reduced by adding the metal conductive layer, so that the energy consumption in transmitting a touch signal may be reduced. Moreover, because the metal conductive layer is shielded by the black matrix, the display effect will not be influenced. In other implementations, the metal conductive layer may alternatively be located under the common electrode layer.

Preferably, the first slit overlaps with the scan line. The black matrix extends towards the inside of the pixel unit to form a first extension part at an overlapping area where the first slit and the scan line overlap, to partially shield the first slit. Preferably, the length of the first extension part is within a range of 1 μm to 3 μm, and the first extension part may be rectangle or trapezium shaped.

Figure 12:
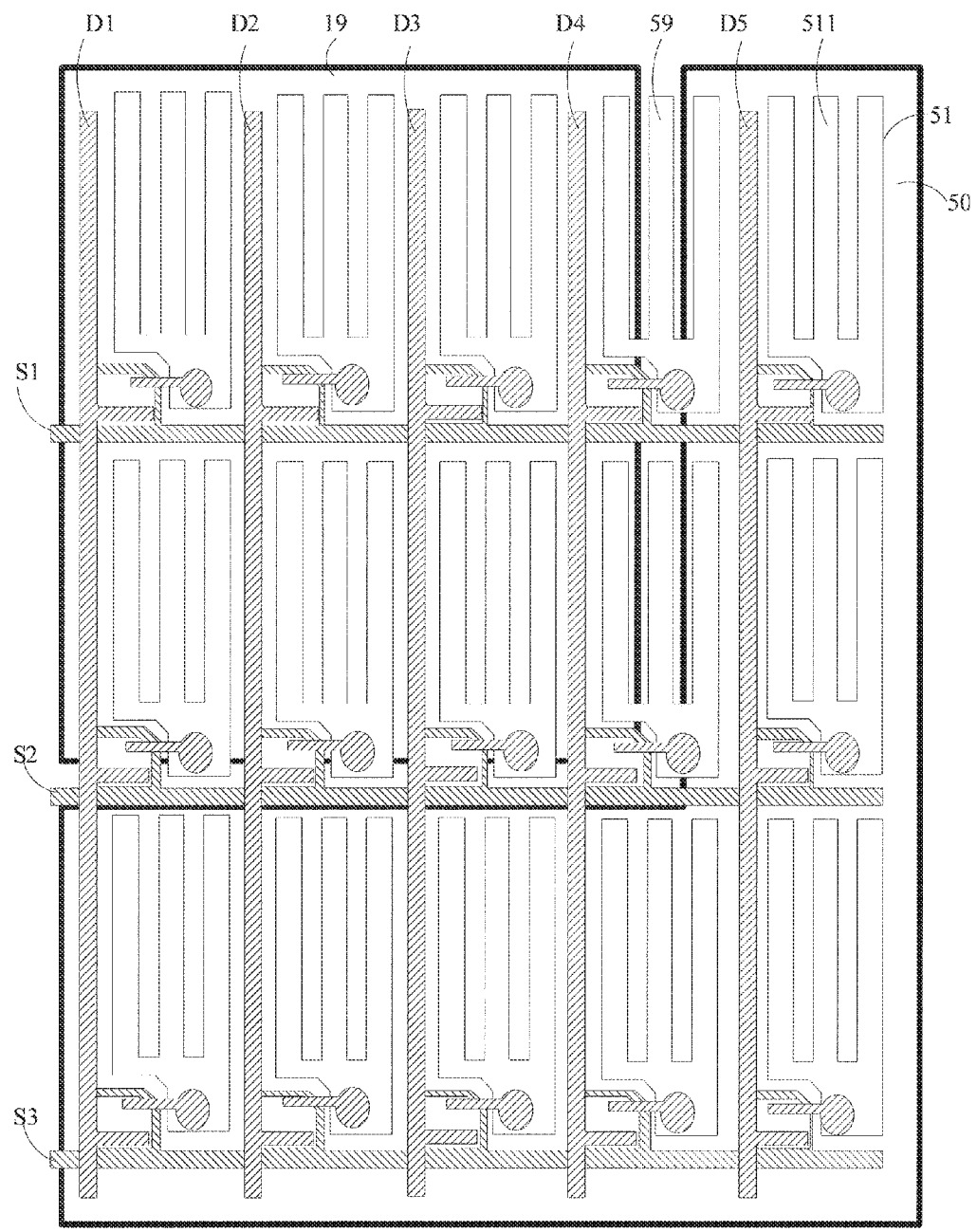
FIG. 12 is a schematic diagram of an array substrate of a liquid crystal display device according to a fourth embodiment of the disclosure.
Figure 13:
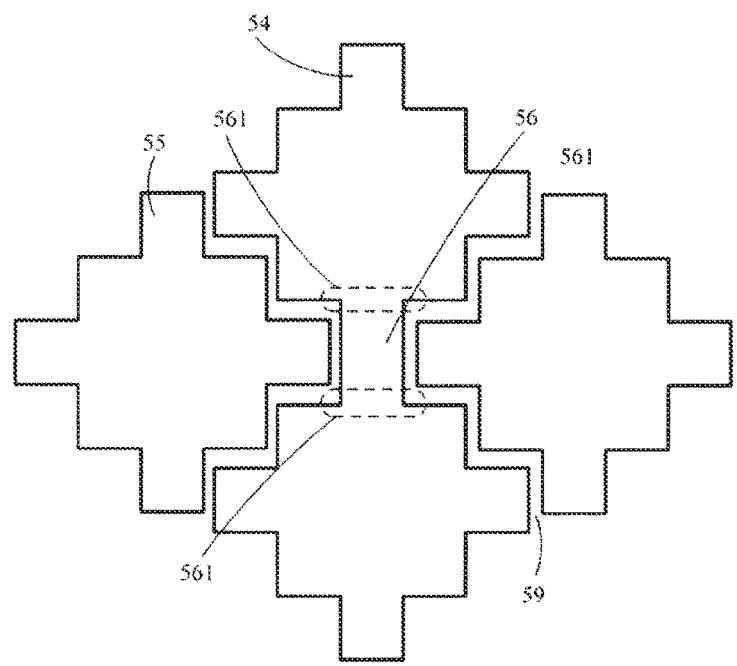
FIG. 13 is a schematic diagram of a common electrode layer of the liquid crystal display device according to the fourth embodiment of the disclosure.

The fourth embodiment of the disclosure provides a liquid crystal display device. Referring to FIG. 12 and FIG. 13, FIG. 12 is a schematic diagram of an array substrate of the liquid crystal display device according to the fourth embodiment of the disclosure, and FIG. 13 is a schematic diagram of a common electrode layer of the liquid crystal display device according to the fourth embodiment of the disclosure. The liquid crystal display device includes a plurality of data lines D1, D2, D3, D4 and D5 and a plurality of scan lines S1, S2 and S3. The plurality of data lines insulatedly intersect the plurality of scan lines, and the plurality of data lines and the plurality of scan lines define a plurality of pixel units. FIG. 12 only shows pixel units in 3 rows and 5 columns for ease of illustration.

Each pixel unit includes a common electrode 50 and a pixel electrode 51, an insulating layer is located between the common electrode 50 and the pixel electrode 51, and an in-plane electric field may be formed by the common electrode 50 and the pixel electrode 51. Specifically, in the fourth embodiment, the common electrode 50, which is a planar electrode, is located under the pixel electrode 51, and the pixel electrode 51 includes a plurality of strip electrodes 511. An in-plane electric field may be formed between the planar common electrode 50 and the plurality of strip electrodes 511 of the pixel electrode 51 to drive liquid crystal molecules to rotate.

Referring to FIG. 13, a common electrode layer that forms a plurality of the common electrodes 50 is further adapted to form touch electrodes and touch signal wires 56 of a touch structure. Specifically, the touch electrodes include driving electrodes 54 and sensing electrodes 55. The touch signal wire 56 connects adjacent driving electrodes 54 to each other. Slits are arranged between the driving electrodes 54, the sensing electrodes 55 and the touch signal wires 56 so that the driving electrodes 54 are physically separated and electrically insulated from the sensing electrodes 55, except at a junction 561 between the touch signal wire 56 and the driving electrode 54. The slits include first slits 59 arranged in parallel to the data lines, and the first slit 59 overlaps with the pixel electrode 51.

In the fourth embodiment, the touch structure is a structure with two conductive layers, where the common electrode layer is one of the two conductive layers and forms the driving electrodes 54, the sensing electrodes 55, and the touch signal wire 56. The touch signal wire 56 is a wire for connecting two adjacent driving electrodes 54. The other one of the two conductive layers is referred to as a second conductive layer hereinafter, and an insulating layer is arranged between the second conductive layer and the common electrode layer. The second conductive layer includes second touch signal wires each configured to connect two adjacent sensing electrodes 55. A second touch signal wire electrically connects two adjacent sensing electrodes 55 by a via hole disposed in the insulating layer.

In the fourth embodiment, the driving electrode 54 and the sensing electrode 55 each have basically a diamond-like shape. The slit between the driving electrode 54 and the sensing electrode 55 is polygonal-shaped. The polygonal-shaped slit includes the first slit 59 arranged in parallel to the data lines. The first slit 59 overlaps with the pixel electrode 51. Specifically, the first slit 59 superposes one of the plurality of strip electrodes 511 of the pixel electrode 51.

Alternatively, in other embodiments, the touch signal wire electrically connects adjacent sensing electrodes to each other, and the second touch signal wire electrically connects adjacent driving electrodes to each other via a via hole in the insulating layer.

In the liquid crystal display device according to the fourth embodiment of the disclosure, the touch structure is a double-layer mutual capacitance structure. In other embodiments, the common electrode layer may also be adapted to form a double-layer self-capacitance structure.

Figure 14:
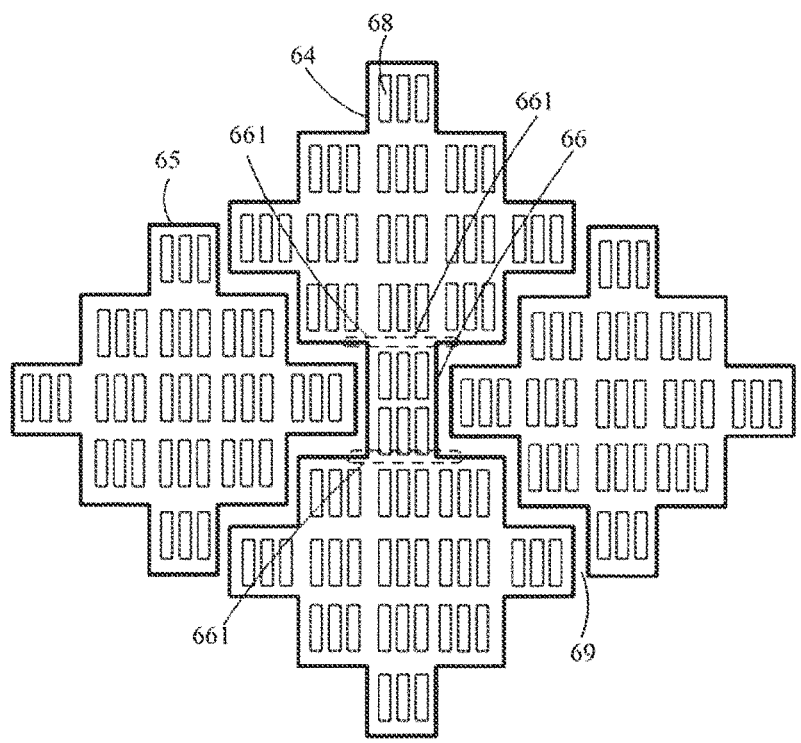
FIG. 14 is a schematic diagram of a common electrode layer of another liquid crystal display device according to the fourth embodiment.
Figure 15:
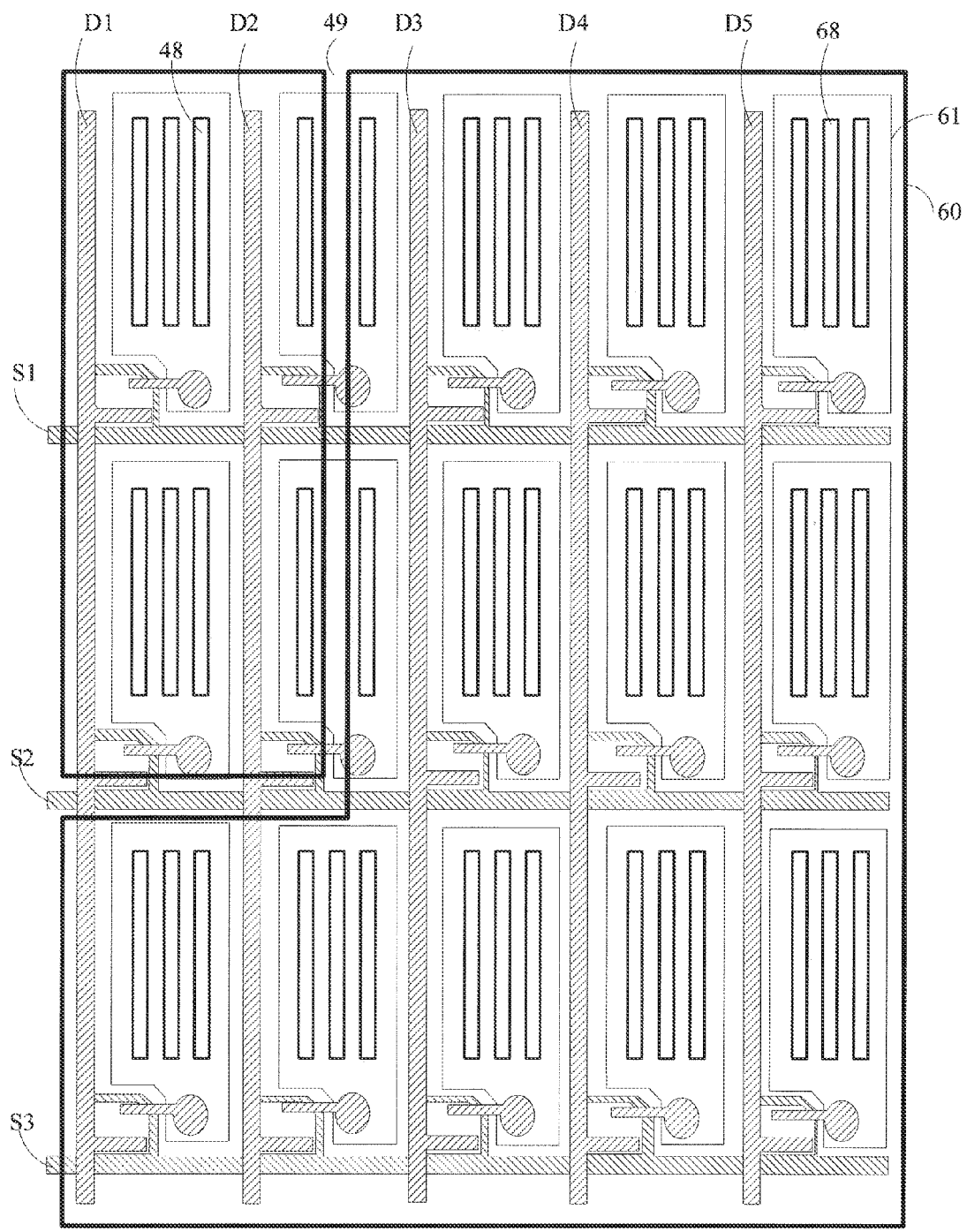
FIG. 15 is a schematic diagram of an array substrate of another liquid crystal display device according to the fourth embodiment.

Referring to FIG. 14 and FIG. 15, FIG. 14 is a schematic diagram of a common electrode layer of another liquid crystal display device according to the fourth embodiment of the disclosure, and FIG. 15 is a schematic diagram of an array substrate of the another liquid crystal display device according to the fourth embodiment of the disclosure.

As shown in the figures, the liquid crystal display device includes a plurality of data lines D1, D2, D3, D4 and D5 and a plurality of scan lines S1, S2 and S3, where the plurality of data lines insulated intersect the plurality of scan lines, and the plurality of data lines and the plurality of scan lines define a plurality of pixel units. FIG. 15 only shows pixel units in 3 rows and 5 columns for ease of illustration.

Each pixel unit includes a common electrode 60 and a pixel electrode 61. An insulating layer is located between the common electrode 60 and the pixel electrode 61, and an in-plane field may be formed by the common electrode 60 and the pixel electrode 61. Specifically, in the array substrate of the another liquid crystal display device according to the fourth embodiment, the common electrode 60 is located above the pixel electrode 61 which is a planar electrode, and the common electrode 60 has a third slit 68 for forming an in-plane field with the pixel electrode 61.

Referring to FIG. 14, a common electrode layer forming a plurality of the common electrodes 60 is further adapted to form touch electrodes and touch signal wires 66 of a touch structure. The touch electrodes include driving electrodes 64 and sensing electrodes 65, and each touch signal wire 66 electrically connects two adjacent driving electrodes 64 to each other. Slits are arranged between the driving electrodes 64, the sensing electrodes 65 and the touch signal wires 66 so that the driving electrodes 64 are physically separated and electrically insulated from the sensing electrodes 65, except at a junction 661 between the touch signal wire 66 and the driving electrode 64. The slits include first slits 69 arranged in parallel to the data lines, and the first slit 69 overlaps with the pixel electrode 61.

In the another liquid crystal display device according to the fourth embodiment, the touch structure is a structure with two conductive layers. The common electrode layer is one of the two conductive layers and forms the driving electrodes 64, the sensing electrodes 65, and the touch signal wires 66, and the touch signal wire 66 is configured to connect the driving electrodes 64. The other one of the two conductive layers is referred to as a second conductive layer hereinafter, and an insulating layer is arranged between the second conductive layer and the common electrode layer. The second conductive layer includes second touch signal wires each for connecting adjacent sensing electrodes 65, and the second touch signal wire electrically connects two adjacent sensing electrodes 65 by a via hole in the insulating layer.

In the another liquid crystal display device according to the fourth embodiment, the driving electrode 64 and the sensing electrode 65 each have basically a diamond-like shape. The slit between the driving electrode 64 and the sensing electrode 65 is polygonal-shaped. The polygonal-shaped slit includes a first slit 69 parallel to the data lines, and the first slit 69 overlaps with the pixel electrode 61. Specifically, the first slit 69 at least partially overlaps with the third slit 68. Optionally, the width of the first slit 69 is larger than that of the third slit 68 by a difference value of about 1 μm.

Preferably, a metal conductive layer is further arranged at positions on the common electrode layer that correspond to the data lines or the scan lines. The metal conductive layer is electrically connected with the common electrode layer, and completely overlaps with the data lines or the scan lines in the light transmission direction and is also shielded by the black matrix. Because the common electrode layer is typically made of indium tin oxide having large resistance, the resistance may be reduced by adding the metal conductive layer, so that the energy consumption in transmitting the touch signal may be reduced. Moreover, because the metal conductive layer is shielded by the black matrix, the display effect will not be influenced. In other implementations, the metal conductive layer may alternatively be located under the common electrode.

Preferably, the first slit 69 overlaps with the scan line, and the black matrix extends towards the inside of the pixel unit to form a first extension part at an overlapping area where the first slit 69 and the scan line overlap, so as to partially shield the first slit 69. Specifically, the first slit 69 typically penetrates through several columns of pixel units, thus the first slit 69 overlaps with the scan line(s), that is, the common electrode layer cannot shield the scan lines in the overlapping area, and the electric field of the scan lines will influence the display effect. Therefore, in this embodiment, the first extension part of the black matrix is configured to partially shield the first slit 69 so as to eliminate the influence. Preferably, when the length of the first extension part is within a range of 1 μm to 3 μm, abnormal display will be partially shielded without decreasing excessively the aperture ratio. Preferably, the first extension part may be rectangle or trapezium shaped.

Preferably, the first slits 69 are all located inside pixel units of the same color. By arranging all the first slits 69 inside the pixel units of the same color, the influence caused by the transmittance difference will be reduced visually. Preferably, all the first slits 69 are respectively arranged inside the pixel units corresponding to the blue color filters, because the human eyes are insensitive mostly to blue among red, green and blue, thus the influence caused by the transmittance difference may be further reduced.

In another liquid crystal display device according to the above described fourth embodiment of the disclosure, the touch structure is a double-layer mutual capacitance structure. In other embodiments, the common electrode layer may also be adapted to form a double-layer self-capacitance structure.

The above sequence of the embodiments of the disclosure is only intended to describe the disclosure, rather than indicating the priority of the embodiments. Apparently, various modifications and variations may be made on the present invention by one of ordinary skills in the art without departing from the spirit and scope of the invention. Therefore, if these modifications and variations made on the present invention pertain to the scope of the invention as defined by the claims and their equivalents, the invention also intends to encompass such modifications and variations.

What is claimed is:

1. A liquid crystal display device, comprising:
   a plurality of data lines and a plurality of scan lines intersecting each other and electrically insulated from each other;
   a plurality of pixel units defined by the data lines and the scan lines, each of the pixel units comprising a common electrode and a pixel electrode electrically insulated from each other by an insulating layer, the common electrode and the pixel electrode of a pixel unit forming an in-plane electric field when a voltage is applied thereto;

a common electrode layer comprising a plurality of the common electrodes connected together, a plurality of touch electrodes, and a plurality of touch signal wires, wherein each of the touch signal wires is electrically connected with a corresponding touch electrode; and a plurality of first slits disposed in parallel to the data lines, each of the first slits being disposed between two adjacent touch electrodes or between a touch electrode and an adjacent touch signal wire, but not at a junction between the touch electrode and the adjacent touch signal wire, wherein a first slit overlaps with a pixel electrode within a pixel unit.

2. The liquid crystal display device according to claim 1, wherein a common electrode is located below a pixel electrode, the pixel electrode comprises a plurality of strip electrodes, and a first slit overlaps with one of the plurality of strip electrodes of the pixel electrode in at least one of the plurality of pixel units.

3. The liquid crystal display device according to claim 2, wherein a projection of the first slit overlapping with the one of the plurality of strip electrodes of the pixel electrode falls within a projection of the one of the plurality of strip electrodes in a light transmission direction, and a distance from an edge of the first slit to an edge of the one of the plurality of strip electrode is less than or equal to 1 μm; or the projection of the one of the plurality of strip electrodes of the pixel electrode falls within the projection of the first slit, and the distance from the edge of the first slit to the edge of the one of the plurality of strip electrodes is less than or equal to 1 μm.

4. The liquid crystal display device according to claim 1, wherein a common electrode is located above a planar pixel electrode in a pixel unit, the common electrode having a third slit for forming an in-plane electric field with the planar pixel electrode, and a first slit at least partially overlaps with the third slit.

5. The liquid crystal display device according to claim 1, wherein the plurality of first slits are located in pixel units of a same color.

6. The liquid crystal display device according to claim 5, wherein the plurality of first slits are located in the pixel units of a blue color.

7. The liquid crystal display device according to claim 2, wherein, in at least one of the plurality of pixel units without the first slit, the common electrode comprises a second slit having a width equal to a width of the first slit, and the second slit overlaps with a strip electrode of the pixel electrode.

8. The liquid crystal display device according to claim 5, wherein, in at least one of the plurality of pixel units of a blue color and without the first slit, the common electrode comprises a second slit having a width equal to a width of the first slit, and the second slit overlaps with a strip electrode of the pixel electrode.

9. The liquid crystal display device according to claim 1, further comprising a black matrix for shielding the data lines and the scan lines, wherein the first slit overlaps with the scan line, and the black matrix extends towards inside of the pixel unit to form a first extension portion at an overlapping area where the first slit and the scan line overlap with each other, and the first extension portion partially shields the first slit.

10. The liquid crystal display device according to claim 9, wherein a length of the first extension portion of the black matrix is in a range of 1 μm to 3 μm.

11. The liquid crystal display device according to claim 9, wherein the first extension portion of the black matrix is rectangle or trapezium shaped.

12. The liquid crystal display device according to claim 9, wherein in at least one of the plurality of pixel units without the first slit, the common electrode has a second slit, a width of the second slit is equal to the width of the first slit, and the second slit overlaps with the strip electrode of the pixel electrode; the black matrix extends towards inside of the at least one of the plurality of pixel units without the first slit to form a second extension part, and the second extension part has the same shape as the first extension part.

13. The liquid crystal display device according to claim 1, further comprising a metal conductive layer arranged above or below the common electrode layer at positions corresponding to the data lines or scan lines, and the metal conductive layer is electrically connected with the common electrode layer.

* * * * *